(12) United States Patent
Badyal

(10) Patent No.: US 7,882,150 B2
(45) Date of Patent: Feb. 1, 2011

(54) HEALTH ADVISOR

(75) Inventor: Tushar Badyal, Jammu (IN)

(73) Assignee: Accenture Global Services Ltd., Dublin (IE)

( * ) Notice: Subject to any disclaimer, the term of this patent is extended or adjusted under 35 U.S.C. 154(b) by 384 days.

(21) Appl. No.: 12/025,594

(22) Filed: Feb. 4, 2008

(65) Prior Publication Data

US 2009/0164466 A1  Jun. 25, 2009

(51) Int. Cl.
G06F 17/30 (2006.01)
(52) U.S. Cl. .......................................... 707/803; 705/26
(58) Field of Classification Search .............. 707/104.1, 707/104.803; 705/26
See application file for complete search history.

(56) References Cited

U.S. PATENT DOCUMENTS

| | | | | | |
|---|---|---|---|---|---|
| 5,673,691 | A | * | 10/1997 | Abrams et al. ............. | 600/300 |
| 6,980,999 | B1 | * | 12/2005 | Grana ........................ | 707/803 |
| 7,247,023 | B2 | * | 7/2007 | Peplinski et al. ........... | 434/127 |
| 2003/0091964 | A1 | * | 5/2003 | Yeager ...................... | 434/127 |
| 2003/0158756 | A1 | * | 8/2003 | Abramson ................... | 705/3 |
| 2003/0208409 | A1 | * | 11/2003 | Mault ........................ | 705/26 |
| 2004/0002041 | A1 | * | 1/2004 | Peplinski et al. ........... | 434/127 |
| 2004/0091843 | A1 | * | 5/2004 | Albro et al. ................ | 434/127 |
| 2004/0116780 | A1 | * | 6/2004 | Brown ........................ | 600/300 |
| 2005/0021361 | A1 | * | 1/2005 | Huang et al. .................. | 705/1 |
| 2005/0032034 | A1 | * | 2/2005 | Dodds ........................ | 435/4 |
| 2005/0095628 | A1 | * | 5/2005 | Krempin et al. ............. | 435/6 |
| 2005/0240434 | A1 | * | 10/2005 | Wooten et al. ................ | 705/2 |
| 2006/0062859 | A1 | * | 3/2006 | Blum et al. ................. | 424/725 |
| 2006/0074279 | A1 | * | 4/2006 | Brover ....................... | 600/300 |
| 2006/0122468 | A1 | * | 6/2006 | Tavor ......................... | 600/300 |
| 2006/0199155 | A1 | * | 9/2006 | Mosher ....................... | 434/127 |
| 2007/0030339 | A1 | * | 2/2007 | Findlay et al. ........... | 348/14.01 |

* cited by examiner

*Primary Examiner*—Don Wong
*Assistant Examiner*—Sheree N Brown
(74) *Attorney, Agent, or Firm*—Fish & Richardson P.C.

(57) ABSTRACT

Systems and methods are disclosed for providing health and diet advice. A user may establish a user profile that may include information relating to the user's health and nutritional needs. The user may visit a restaurant or other food service location and may be presented with a menu that includes a variety of menu options. The user may access the user profile at the restaurant or food service location and may be provided advice and suggestions regarding the available menu options. The diet advisor may perform a comparison of the health and nutritional needs of the user with the available menu options. The diet advisor may assist a user in selecting a menu option at a restaurant or food service location that is healthy and will provide the user with the proper balance of nutrients.

20 Claims, 5 Drawing Sheets

Figure 5

HEALTH ADVISOR

FIELD OF THE INVENTION

The invention relates to providing users with health benefits. More particularly, the invention relates to providing users with advice regarding health and dietary needs.

BACKGROUND OF THE INVENTION

In modern culture, many people develop poor health and fail to consume a balanced diet and perform an acceptable amount of exercise. Society promotes many poor eating and health habits by the encouraging consumers to purchase unhealthy foods such as fast food, fried food, and other junk food options that contain high quantities of fat, cholesterol, and other potentially harmful ingredients. Unfortunately, most people are unable to resist eating the junk food and fail to exercise will power to refuse the junk food. For example, unhealthy and inactive people develop many health problems including weight gain, disease, premature aging, mental health issues, fatigue, and unappealing figures. Eating a properly balanced diet based on an individual's nutritional needs will help promote that individual's customized health needs.

Modern culture also promotes a busy lifestyle that requires people to devote a significant portion of time to chores, work, family, friends, and other time-consuming activities that are not likely to include exercise or encourage healthy eating habits. For example, a person may have a limited amount of time to prepare a dinner and may prepare a quick meal or visit a restaurant or fast food location to purchase a quick meal. The person may not have knowledge about the nutritional value of the quick meal or the restaurant or fast food menu options such as fried food, hamburgers, French fries, and pizza. The same person may be required to select from a limited group of menu options that contains mostly unhealthy foods.

Some menu options at a restaurant or other food service location include healthy selections and/or may offer a better food selection relative to unhealthy food selections on the menu. A person would be more likely to select a healthy menu choice if told to do so or provided a suggestion of healthy choices. However, menu options at restaurants and other food service locations rarely provide nutritional information for the consumers. Even the menu options that provide nutritional information fail to consider the individual health needs of each person.

Therefore, systems and methods are needed that encourage a person to improve their health by making healthy food choices and by encouraging a person to engage in physical activity. Further, systems and methods are needed that reduce or eliminate a person's temptation to make unhealthy food choices at a restaurant or other food service location.

BRIEF SUMMARY OF THE INVENTION

In a first embodiment, a method of automating a diet advisor may comprise identifying a user that is associated with a user profile related to a user profile data file, the user profile having at least one dietary element; storing the user profile data file in a memory on a computer network, the user profile data file associated with a unique identifier within the memory; relating a plurality of menu options to a menu options data file, each of the menu options having a nutritional value; determining user nutrition data for a user and storing the user nutrition data in the user profile; comparing the user nutrition data and the nutritional value of the menu options; and creating a user menu based at least in part on the comparing of the user nutrition data and the nutritional values of the menu options, the user menu having at least one of the menu options.

In a second embodiment, another aspect of the invention relates to a system for diet advising. The system may comprise a computing device for executing software for creating a data file associated with a user and a user profile; a receiver for receiving user data including user nutrition information on a computer network; a server comprising memory for storing computer-executable instructions; and a processor for executing the computer-executable instructions to perform a method that comprises: (a) receiving data form the computing device at a restaurant over a computer network; (b) storing the user data in the data file associated with the user profile; (c) creating a user menu that indicates menu options that include acceptable ingredients for the user; and (d) updating the user profile when the user selects a user selection from the user menu. The computing device, the receiver, and the server may form an automated diet advisor.

In a third embodiment, a computer readable medium may comprise computer executable instructions to perform a method. The method may comprise the steps of identifying a user that may be associated with a user profile related to a user profile data file, the user profile having at least one dietary element; storing the user profile data file in a memory on a computer network, the user profile data file associated with a unique identifier within the memory; relating a plurality of menu options to a menu options data file, each of the menu options having a nutritional value; determining user nutrition data for a user and storing the user nutrition data in the user profile; comparing the user nutrition data and the nutritional value of the menu options; creating a user menu based at least in part on the comparing of the user nutrition data and the nutritional values of the menu options, the user menu having at least one of the menu options; prompting the user to select a user selection from the user menu; and updating the user profile based at least in part on the user selection.

In a fourth embodiment, a method of selecting a menu option may comprise creating a user having a user profile that stores information about the user in a memory located on a computer network; determining acceptable dietary options for a user and relating the acceptable dietary options with the user profile; creating a data file that includes nutritional information for a second menu option at the restaurant that contain acceptable ingredients; creating a data file that may include nutritional information for a first menu option at the restaurant, the first menu option containing unacceptable ingredients; creating a second data file that may include nutritional information for a second menu option at the restaurant, the second menu option containing acceptable ingredients; accessing the user profile from a computing device that may be coupled to the computer network, the computing device being positioned at the restaurant; comparing the first menu option to the acceptable to the acceptable dietary options; comparing the second menu option to the acceptable dietary options; determining whether the first menu option may be one of the acceptable dietary options; determining whether the second menu option may be one of the acceptable dietary options; preventing the user from selecting a first menu option based at least in part on the first menu option containing unacceptable ingredients; permitting the user to select a second menu option based at least in part on the second menu option containing acceptable ingredients; selecting the second menu option for the user; and reporting the second menu option to the user profile.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of various example embodiments of the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

A. General Description of a Health Advisor System and Method

In general, as described above, aspects of the invention relate to a method of automating a diet advisor, comprising the steps of: (a) identifying a user that may be associated with a user profile related to a user profile data file, the user profile having at least one dietary element; (b) storing the user profile data file in a memory on a computer network, the user profile data file associated with a unique identifier within the memory; (c) relating a plurality of menu options to a menu options data file, each of the menu options having a nutritional value; (d) determining user nutrition data for a user and storing the user nutrition data in the user profile; (e) comparing the user nutrition data and the nutritional value of the menu options; and (f) creating a user menu based at least in part on the comparing of the user nutrition data and the nutritional values of the menu options, the user menu having at least one of the menu options.

A user may be identified and the user may be any person, group of people, computer program, or other entity that may wish to access an automated diet advising system. A user may wish to access an automated diet advising system for a many reasons, including but not limited to, improving quality of health for personal and medical motivations, monitor nutritional content of consumed food, provide motivation for making healthy choices, and other medical, health, and personal reasons. Further, many people have difficulty exercising will power and control cravings and other unhealthy desires to prevent medical and other health problems. Many users that may not be capable of controlling their diets may develop physical and mental problems. The user may be any person that may be interested in having diet advising assistance and may also be any person that may be placed on a restricted or special diet by a medical or health care provider. The user may also wish to track their health habits and may wish to obtain objective analysis of their health needs to improve the overall quality of their health.

The user may establish a user profile that may be related to the user. The user profile may include any information about the user, including but not limited to medical history, nutritional restrictions, dietary needs, and the like, as described in greater detail below. The user profile related to a user profile data file that may be stored on a memory that may be located on a computer network. The computer network may comprise one or more connected computers that are capable of communicating over a wired or wireless medium to share data and other resources, as described in greater detail below.

The user profile data file that may be stored in memory on a computer network. The user profile data file may be assigned a unique identifier such as an Internet Protocol (IP) address that may be configured to locate the user profile data file on the computer network. The unique identifier may also include a file name or other identifier that designates the location of the user profile data file on the computer network and may be easily comprehended by a human user, such as a file name having one or more words.

Another data file may be created and may be saved on a computer network. For example, the data file may be stored on a host server. The host server may be stored on a restaurant's server and may be transmitted to other servers upon receiving a request. Many restaurants may serve menu options that contain varying nutritional values. For example, a pizza may have a first nutritional value when it is prepared by a first restaurant and a second nutritional value when it is prepared by a second restaurant. The first and the second nutritional values may be different. Likewise, a user may request that a restaurant prepare a customized menu option, such as eliminating or adding an ingredient (e.g. adding toppings to a pizza).

For example, a menu options data file may store information about a plurality of menu options and the nutritional values associated with each menu option and/or ingredients that may be included in a menu option. The menu options may include any food product, including but not limited to, menu options at a restaurant or other food service location, menu options selected by the user and/or a medical or nutritional professional, general information about foods and food groups and their nutritional values.

User nutrition data may be determined by the user, a medical or nutritional professional, or other source and may be stored in the user profile. The user nutritional data may include information about a user's dietary restrictions, exercise schedule, or other health and dietary information. The user nutrition data may be compared with the nutritional values of the menu options. The comparison may indicate the menu options that have a nutritional value that may be acceptable for the user to consume. The user may be alerted that a menu option may not be acceptable to consume based at least in part on the comparison of the nutritional values of the menu options and the user nutrition data. The alert may indicate to the user that the menu option may not be acceptable or the menu option may be deleted from the user's choices of menu options.

The user profile may be update to reflect a menu option selection that was made by a user, a revised diet restriction made by a user or another entity having access to the user profile (e.g., a doctor, nurse, physical trainer, dietitian, etc.), or automatically within the diet advisor. Users or other medical or health related people or entities may place diet restriction upon a user profile. For example, a dietitian may evaluate a user's dietary needs monthly and may choose to alter the nutritional values needed by the user based on an analysis of the user's health.

The health or diet advisor system and method may prompt a user to select a user selection from the plurality of menu options. The menu options presented to the user may include those menu options that are acceptable for the user to consume based at least in part on the information that is stored in the user profile. The user may be prompted to make a user selection. The user selection may be required to be a menu option that may be on the user menu comprising one or more acceptable menu options. The system or method of diet advising may prompt the user to select a menu option in any suitable manner, including but not limited to text messaging, symbols, icons, alerts, audible alarms, and the like.

The user may or may not be permitted to select a menu item that may be offered at a restaurant or other food service location that is not part of the user menu that contains acceptable menu options for the user to consume. The user may obtain information from the diet advising system and method to assist in the selection of healthy menu options or may rely on the diet advising system and method to require the user to select acceptable menu options. The user may rely on the diet advising system and method in any suitable fashion and for any reason.

The diet advising system and method may update the user profile after the user has selected a menu option, as described in greater detail below. The diet advising system and method may be updated with any suitable information. The information included in an update to the user profile may relate to the menu option that was recently selected by the user and may include information about the restaurant at which the user is eating. The update may also include additional medical or health information. The frequency of the user's visits to a restaurant or trends or other information relating to the user's eating habits may be included in the update to the user profile. Any desired information may be included in the update to the user profile. The update may be designed to provide the user profile with a current depiction of the user's health and diet.

The diet advisor may also provide updates to the user profile based on user selections. The diet advisor may provide the updates to the user profile and user's nutritional needs on a manual or an automatic basis. For example, the user may select a menu option at a restaurant that includes pizza. The user may be permitted to eat pizza only once per week, which may be indicated as a restriction in the user profile. The diet advisor may notify the user profile that the user is no longer permitted to select a menu option that includes pizza for the remainder of the week. The diet advisor may be updated immediately after a user selects a menu option or may be updated on a periodic basis such as one time per hour, day, or week.

The diet advisor may also update the user profile by manually receiving a request to update a user profile. For example, the user may access the user profile at a restaurant. After the user has selected a menu option, the user may choose to update the user profile with the menu option that was selected. Additionally, another person or entity having access to a user profile may also update the user profile with menu option selections. In some examples, a medical professional may be monitoring a user's diet and may be providing dietary advice based on the user profile. The medical professional may activate a feature that automatically updates the user profile when the user selects a menu option. The user and/or the medical professional may wish to update the user profile only when the menu option includes a particular nutritional value or nutritional ingredient. An alert may also be sent to the user and/or other people or entities having access to the user account when a menu option, nutritional value, or nutritional ingredient is identified in the user profile.

A user menu may be created that may be based at least in part on the comparison of the user nutrition data and the nutritional values of the menu options. The user menu may contain menu options that are acceptable for the user to consume. For example, the user menu may be a listing of only those menu options that are acceptable for a user to consume. The user menu may include a periodic user menu report such as a history of the nutritional values of all food consumed by a user within a period of one day, one week, one month, and/or one year. The user menu may be accessible by the user and a medical or nutritional professional that the user may permit to access the user menu. Restrictions may be placed on the user menu by the people or entities that have access to the user menu and/or the user profile.

In general, another aspect of the invention relates a system for diet advising that comprises: (a) a computing device for executing software for creating a data file associated with a user and a user profile; (b) a receiver for receiving user data including user nutrition information on a computer network; (c) a server comprising memory for storing computer-executable instructions; and a (d) processor for executing the computer-executable instructions to perform a method. The processor may be capable of executing computer-executable instructions that perform a method that comprises: receiving data form the computing device at a restaurant over a computer network; storing the user data in the data file associated with the user profile; creating a user menu that indicates menu options that include acceptable ingredients for the user; and updating the user profile when the user selects a user selection from the user menu. The computing device, the receiver, and the server may form an automated diet advisor.

The computing device may be any computer device that may be capable of connecting to a computer network and accessing a data file and may be wired or wireless. The computing device may be positioned at a restaurant or food service location and may also be positioned at a user's home. The computing device may be a fixed or portable device. For example, a computing device may be positioned at a table at a restaurant or may be a portable device that is provided by the restaurant. The computing device may be transported by a user and may access the user profile and the restaurant menu options by accessing a computer network that is made available at the restaurant, e.g., wireless local area network that may be hosted at the restaurant.

As described above, the data file may include any desired information about a user. The data file may include general information about a user such as the user's telephone number, address, e-mail address, and the like. The data file may also include information about the user's medical history and may also include information from a medical or nutritional professional such as the user's blood pressure, heart rate, weight, height, and other medical information. The data file may include any health and dietary information about a user.

The user profile may contain a range of acceptable nutritional values for a user, as described in greater detail below. The range may be one or more values of nutritional ingredients for a menu option. For example, a user may be permitted to consume between 10 and 20 grams of fat per meal. If a user selects a menu option having a fat content of 35 grams of fat, the user may not be permitted to select the menu option. The user may never see menu options containing a high fat content or may be alerted if the user selects the menu option with a high fat content during the food selection process at a restaurant.

In another example, the range of acceptable nutritional values may include a limitation. The limitation may permit a user to select a menu option, such as pizza, one time per week. If the user has selected pizza once during a week, the user is not permitted to select pizza and pizza may be deleted from the menu options that are presented to the user. After the week has expired, the user may be permitted to select pizza again, but only once during the week. The user profile may be continuously updated based on the user's menu option selections to reflect the user's most recent food choices and to most accurately provide feedback to the user and/or the other medical or health related people and entities that may be permitted to access the user profile.

In yet another example, a user may have a user profile that permits the user to select a small portion of French fries at a restaurant, but restricts the user from selecting a large portion of French fries. The small portion of French fries may contain nutritional values that are permissible because they are within the range of nutritional values that are permitted by the user profile. The user profile may restrict the portion size or amount of the food that a user may wish to select in any desired manner. The user profile may quantify the amount of a menu option that is permitted by the user profile in sizes (e.g., small, medium, large, etc.), portions (e.g., children's portion, lunch portion, dinner portion, etc.), or any other quantity.

A receiver may be configured to receive user data and may be coupled to a computing device. The computing device may be positioned at a restaurant or other food service location. The receiver may be also be configured to receive and send information over a computer network. The receiver may send user information that may be received on a computing device at a restaurant to a server connected to the computer network. The server may also store computer-executable instructions for creating the data file for a user. A processor may execute the computer-executable instructions and may create a data file that may be saved in a memory that may be stored on the server. A computing device positioned at a restaurant may receive data from a computer device that may be connected to a computer network. The user data may be stored in the data file that may be associated with the user profile. A user menu may be created that indicates at least one healthy menu option for the user. The menu option may be one menu option of a plurality of menu options that may be presented in the form of a menu or other list of menu options at a restaurant or other food service location.

The user profile may present the user with one or more menu options at a restaurant. Each of the menu options may be compared to the user profile. The menu options may be assessed based on their nutritional values and nutritional ingredients. The menu options may be dynamically analyzed with a combination of menu options that may be selected by the user. For example, a user profile may permit a user to consume either a hamburger or French fries during lunch. A user may select the hamburger upon comparison of the hamburger with the user profile, French fries are no longer made available as a menu option for the user. On the contrary, if the user selects French fries, then the hamburger is not made available as a menu option for the user. In this case, the user profile is continuously updated to reflect the user's menu options so that the user does not violate the nutritional values and/or restrictions in the user profile.

Another aspect of the invention relates to a computer readable medium that comprises computer executable instructions that perform a method comprising the steps of a method of automating a diet advisor, comprising the steps of: (a) identifying a user that may be associated with a user profile related to a user profile data file, the user profile having at least one dietary element; (b) storing the user profile data file in a memory on a computer network, the user profile data file associated with a unique identifier within the memory; (c) relating a plurality of menu options to a menu options data file, each of the menu options having a nutritional value; (d) determining user nutrition data for a user and storing the user nutrition data in the user profile; (e) comparing the user nutrition data and the nutritional value of the menu options; (f) creating a user menu based at least in part on the comparing of the user nutrition data and the nutritional values of the menu options, the user menu having at least one of the menu options; and (g) prompting the user to select a user selection from the user menu; and (h) updating the user profile based on the user selection.

Another aspect of the invention relates to a method of selecting a menu option that comprises the steps of creating a user having a user profile, the user profile that stores information about the user in a memory located on a computer network; determining acceptable dietary options for a user and relating the acceptable dietary options with the user profile; creating a data file that includes nutritional information for a first menu option at the restaurant, the first menu option containing unacceptable ingredients; creating a data file that includes nutritional information for a second menu option at the restaurant containing acceptable ingredients; accessing the user profile from a computing device coupled to the computer network, the computing device positioned at a restaurant; comparing the first menu option to the acceptable dietary options; comparing the second menu option to the acceptable dietary options; determining whether the first menu option may be one of the acceptable dietary options; determining whether the second menu option may be one of the acceptable dietary options; preventing the user from selecting a first menu option based at least in part on the first menu option containing unacceptable ingredients; permitting the user to select a second menu option based at least in part on the second menu option containing acceptable ingredients; selecting the second menu option for the user; and reporting the second menu option to the user profile.

Specific examples of the invention are described in more detail below. The specific examples are set forth merely to illustrate examples of the invention, and they should not be construed as limiting the invention.

B. Specific Examples of the Invention

The various figures in this application illustrate examples of methods and systems related to a diet advisor, according to this invention. When the same reference number appears in more than one drawing, that reference number is used consistently in this specification and the drawings to refer to the same or similar parts throughout.

Figure 1:
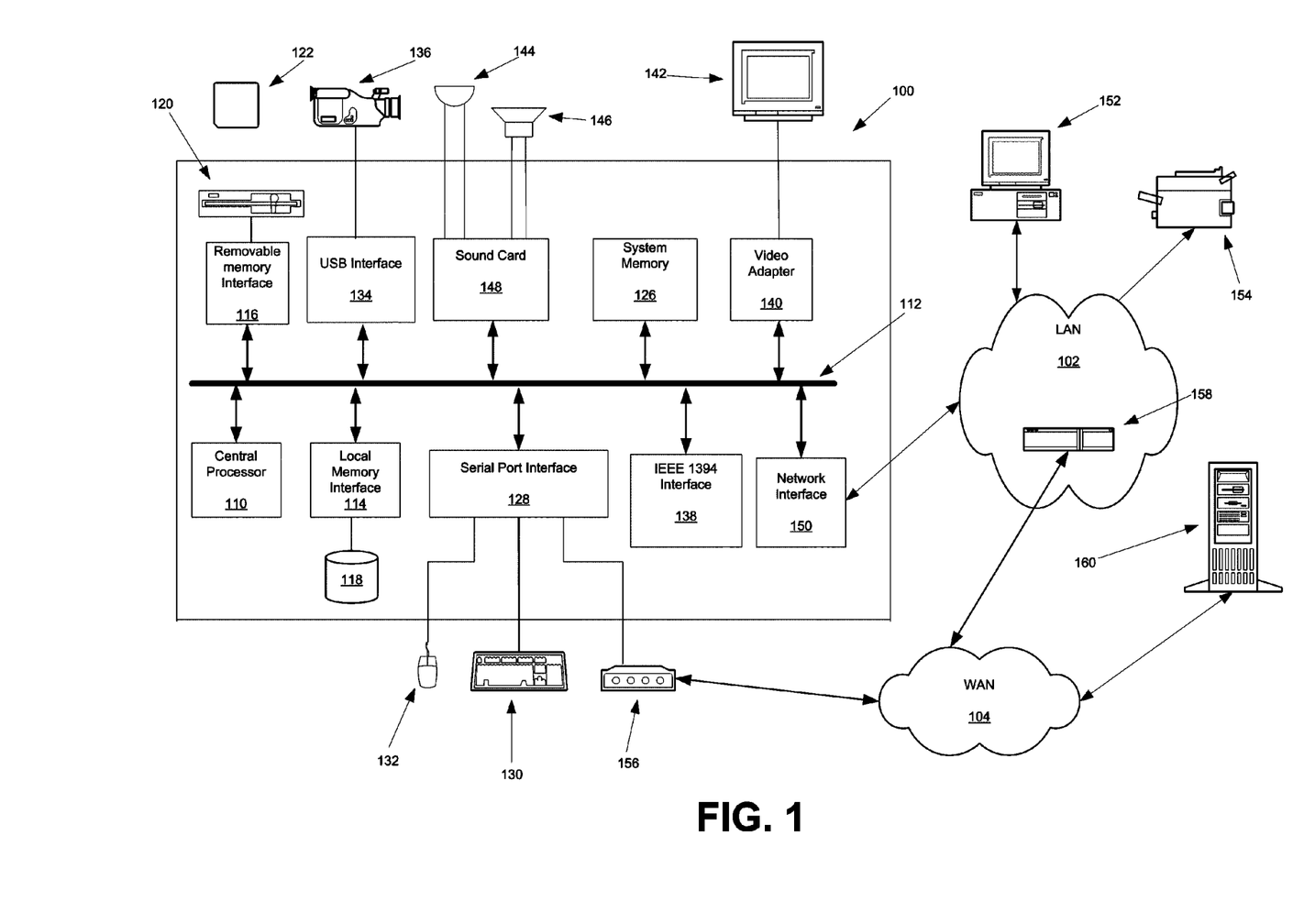
FIG. 1 shows a computing device for implementing an embodiment of the invention.

Elements of the systems and methods of diet advising may be embodied on a computer system or components of a computer network. FIG. 1 illustrates an operating environment in which a computer 100 may be connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 may include a variety of interface units and drives for reading and writing data or files. In particular, computer 100 may include a local memory interface 114 and a removable memory interface 116, respectively, that couple a hard disk drive 118 and a removable memory drive 120 to system bus 112. Examples of removable memory drives may include magnetic disk drives and optical disk drives. Hard disks generally include one or more read/write heads that convert bits to magnetic pulses when writing to a computer-readable medium 122 and magnetic pulses to bits when reading data from the computer-readable medium 122. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user may interact with computer 100 with a variety of input devices. FIG. 1 shows a serial port interface 128 that couples a keyboard 130 and a pointing device 132 to system bus 112. Pointing device 132 may be implemented with a hard-wired or wireless mouse, track ball, pen device, or similar device.

The computer 100 may include additional interfaces for connecting peripheral devices to the system bus 112. FIG. 1 shows a universal serial bus (USB) interface 134 coupling a video or digital camera 136 to the system bus 112. An IEEE 1394 interface 138 may be used to couple additional devices to the computer 100. Furthermore, the interface 138 may be configured to operate with particular manufacture interfaces such as FireWire developed by Apple Computer and i.Link developed by Sony. Peripheral devices may include touch sensitive screens, game pads, scanners, printers, and other input and output devices and may be coupled to the system bus 112 through parallel ports, game ports, PCI boards or any other interface used to couple peripheral devices to a computer.

The computer 100 also includes a video adapter 140 that couples a display device 142 to the system bus 112. The display device 142 may include a cathode ray tube (CRT), liquid crystal display (LCD), field emission display (FED), plasma display or any other device that produces an image that may be viewable by the user. Sound can be recorded and reproduced with a microphone 144 and a speaker 146. A sound card 148 may be used to couple the microphone 144 and the speaker 146 to the system bus 112.

The device connections shown in FIG. 1 are for illustration purposes only and that several of the peripheral devices could be coupled to the system bus 112 via alternative interfaces. For example, the video camera 136 may be connected to the IEEE 1394 interface 138 and the pointing device 132 could be connected to the USB interface 134.

The computer 100 includes a network interface 150 that couples the system bus 112 to the LAN 102. The LAN 102 may have one or more of the well-known LAN topologies and may use a variety of different protocols, such as Ethernet. The computer 100 may communicate with other computers and devices connected to the LAN 102, such as the computer 152 and the printer 154. Computers and other devices may be connected to the LAN 102 via twisted pair wires, coaxial cable, fiber optics, or other media. Alternatively, radio waves may be used to connect one or more computers or devices to LAN 102.

A wide area network (WAN) 104, such as the Internet, can also be accessed by the computer 100. FIG. 1 shows a modem unit 156 connected to the serial port interface 128 and to the WAN 104. The modem unit 156 may be located internal or external to the computer 100 and may be any type of conventional modem, such as a cable modem or a satellite modem. The LAN 102 may also be used to connect to the WAN 104. FIG. 1 shows a router 158 that may connect the LAN 102 to the WAN 104 in a conventional manner. A server 160 may be shown connected to the WAN 104. Numerous additional servers, computers, handheld devices, personal digital assistants, telephones, and other devices may also be connected to the WAN 104.

The operation of the computer 100 and the server 160 may be controlled by computer-executable instructions that may be stored on a computer-readable medium. For example, the computer 100 may include computer-executable instructions for transmitting information to the server 160, receiving information from the server 160 and displaying the received information on display device 142. Furthermore, server 160 may include computer-executable instructions for transmitting hypertext markup language (HTML) or extensible markup language (XML) computer code to the computer 100.

Figure 2:
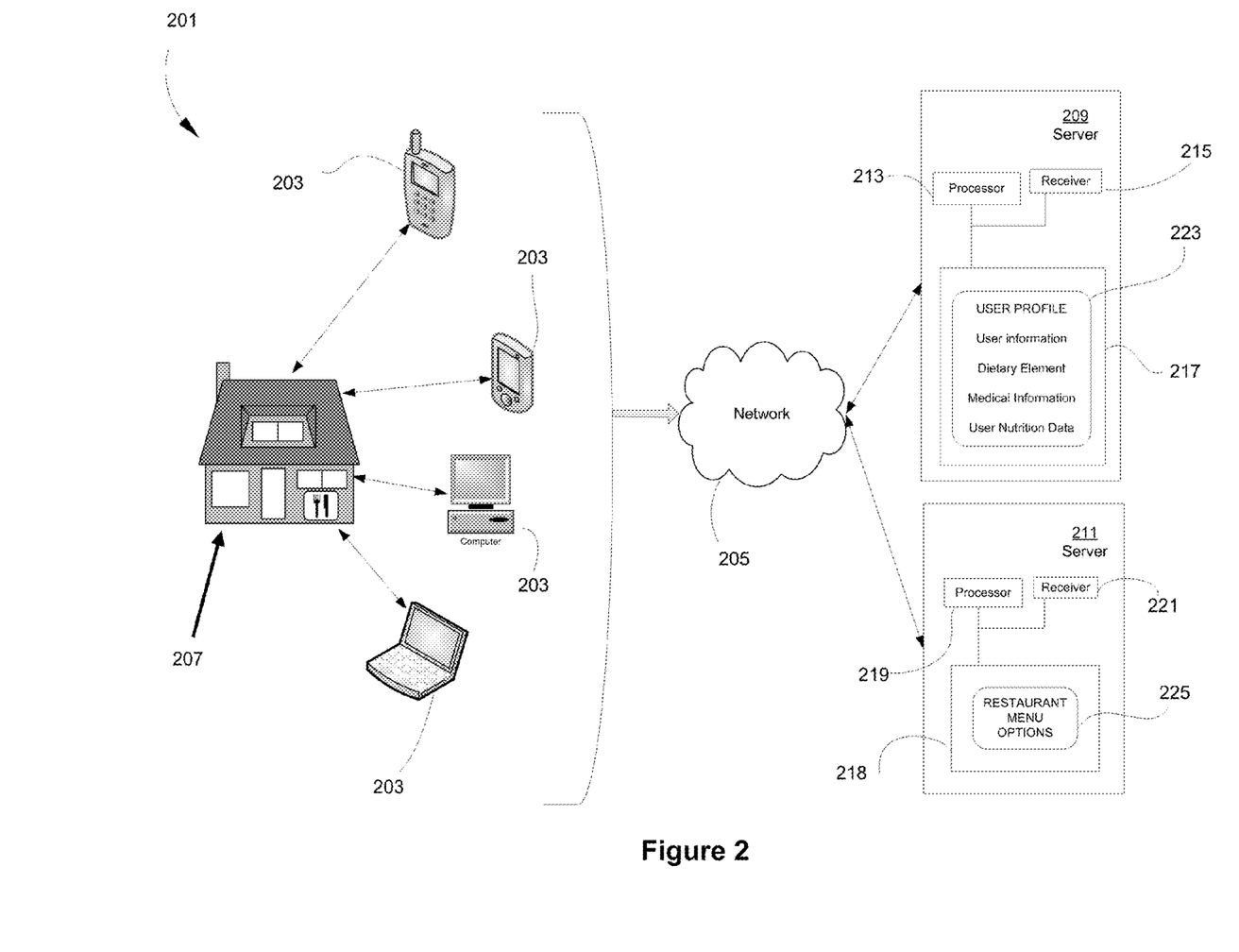
FIG. 2 shows a diet advising system in accordance with aspects of the disclosure.

Referring now to FIG. 2, an automated diet advising system 201 is illustrated. The automated diet advising system 201 may include a computing device 203 that may contain software for creating a data file that may be associated with the automated diet advising system 201. The automated diet advising system may include one or more data files. Each data file may store information that may be accessed by a computing device 203 over a computer network 205. The computing device 203 may be positioned at a restaurant 207 or other location that serves food. The restaurant 207 may be any location that includes a computing device that may be connected to a computer network and may access the one or more data files that may be associated with the automated diet advising system 201.

For example, the restaurant 207 may be a full-service restaurant that supplies a computing device 203 for a user to access a user profile onsite when ordering food. The computing device 203 may be positioned at a table at the restaurant 207. A user may select a menu option from a physical menu or an electronic menu and nutritional information about the menu options may be entered into the computing device 203. The physical menu may be a paper menu or may be an electronic menu that the user may view to select menu options.

In another example, the user may access the user profile and a group of acceptable menu options may be offered by a restaurant. The group of acceptable menu options may be reflected in an acceptable menu options list (not shown). The acceptable menu options list may include only the restaurant's menu options that are accepted by the user profile. The acceptable menu options list may also include all of the restaurant's menu options, but may send an alert to the user and/or other who have permission to access the user profile.

Each of the restaurant's menu options may be assigned a score or value based at least in part on the nutritional values and restrictions in the user profile. The menu options may be ranked based at least in part on the score or value assigned during the assessment process. The menu options may be grouped by score into categories that are acceptable, moderately acceptable, unacceptable, highly unacceptable menu options, or any other grouping scheme. The menu options may also be ranked based at the assigned score or value and may be presented to the user in the order of the menu option's ranking. For example, a first menu option, a second menu option, and a third menu option may each have a score of one, two, and three, respectively. The first menu option may be presented as a first selection for a user, the second menu option may be present as a second selection for a user, and the third menu option may be presented as a third selection for a user. The user may be presented with one menu option and may indicate whether the user selects that menu option before being presented with a second menu option.

A user server 209 and a restaurant server 211 may be connected to the computer network 205 and may be connected through a wired or wireless connection. The user server 209 and the restaurant server 211 may each include a processor 213, 219 and a receiver 215, 221, respectively. The processor 213, 219 associated with each server may be capable of executing computer executable instructions, as described in detail above. The receiver 215, 221 may be capable of receiving information, also described in detail above.

The user server 209 and the restaurant server 211 may include memory 217, 218, respectively. The memory may be capable of storing data and data files, as described in detail above. The memory associated with the user server 209 may store a user profile 223 that includes information about the user such as dietary elements for the user, medical information about the user, user nutrition data, and the like. The memory associated with the restaurant server 211 may store a restaurant menu options data file 225 that may include information about the restaurant and the menu options at the restaurant.

The automated diet advising system comprises a computing device 203, a receiver 215, 221 for receiving data, a server 209, 211 comprising memory 217, 218 for storing computer-executable instructions, and a processor 213, 219 for executing the computer-executable instructions. The computer-executable instructions perform a method of automated diet advising. The computing device 203, the receiver 215, 221, and the server 209, 211 may also form a diet advising system that includes a method of selecting a menu option for a user from a restaurant menu.

The computer executable instructions may be executed on any computer. For example, the computer executable instructions may be stored on the restaurant server 211 and computing devices 203 may be permitted to access the restaurant server 211 for the menu option information that may be stored in the restaurant menu options data file 225. In this example, a computing device 203 may be a terminal device that may be configured to access the restaurant server 211 in a typical online transaction processing (OLTP) system. Oftentimes, OLTP systems include software that is stored on a server to which several clients may be coupled, most typically over a computer network. A group of clients may submit a request to a server to access information and/or to execute computer executable instructions in a shared fashion. The OLTP may host software for providing a user with diet advice. The group of clients may be operated by one or more companies or entities that provide diet advice to a user. The companies or entities may be a private company, a medical service (e.g., a doctor, hospital, dietitian, physical therapist, etc.), or any other group that provides health care and diet advising information to a user. The relationship between the clients and the server may permit the sharing of data files and other resources, such as computer executable instructions.

As discussed in detail above, the computing device 203 may contain software for creating a data file 223, 225. Software may be stored within memory 217, 218 and may provide instructions to the processor 213, 219 for enabling the computing device 203 to perform various functions. For example, the memory 217, 218 may store software, such as an operating system, application programs, and associated data files 223, 225. Alternatively, some or all of the computer executable instructions for computing device 203 may be embodied in hardware or firmware (not shown). As described in detail below, the data files 223, 225 may provide centralized storage of user information, information related to restaurant menu options, and any other desired information. The data file 223, 225 may be accessible from a computing device 203 that is directly or remotely connected to the computer network and servers 209 and 211.

The diet advising system may include communication over any type of network. The diet advising system may communicate over a computer network, a cellular network, a telephone network, or other network that is capable of sharing information such as data and computer executable instructions. The user devices that are coupled to a cellular network, a telephone network, a public packet network, and the like may communicate with one another through a gateway (not shown). A gateway may provide a link between computers or networks. The gateway may also control access between computers or between networks.

The automated diet advising system 201 may be stored on a server and may be accessible through a webpage on the Internet or an intranet. The webpage may have security, such as a username and password that must be entered before the customer may obtain access to the diet advising system 201. Messages to and from the webpage may also be encrypted. Any form of security may be implemented on the diet advising system 201 and/or data files 223, 225.

Referring again to FIG. 2, a computing device 203 may be coupled to a computer network 205 and may contain software for creating a data file, such as the user profile 223 and the restaurant menu options 225. The computing device 203 may be any electronic device that receives and processes information according to a set of instructions. The computing device 203 may have a user interface that may be capable of producing a visual display. A request to access a server such as user server 209 and restaurant server 211 and/or data files stored in memory on the servers, may also be protected via security measures.

The computing device 203 may be any electronic device that receives and processes information according to a set of instructions in the software. The software may be a set of detailed computer-executable instructions that a computing device 203 may execute. The software provides the computing device 203 with the ability to create a data file and provide diet advising based on data stored within the data files.

The receivers 215, 221 may be any device that may be capable of receiving an electrical signal. Moreover, the receivers 215, 221 may be a device that may also be capable of transmitting the electrical signal from one location to another. For example, a receiver may be input/output (I/O) hardware in a computing device or server that may send and receive data and store the data in a data file or send the data to a processor for processing.

The servers 209, 211 may be any shared computer that may be operatively coupled to a network 205 and that acts as a repository and distributor of data. The servers 209, 211 may be any shared computing device. The servers 209, 211 also may be a fast and robust computing device that acts to organize and regulate data that may be transmitted to the network 205. The servers 209, 211 that are illustrated in FIG. 2 may be accessible as a web server over the Internet or an intranet. Furthermore, the servers 209, 211 may be embodied as a server farm comprising multiple computers that provide a scaleable and/or secure architecture.

A server may include memory 217, 218 for storing computer-executable instructions and processors 213, 219 for executing computer-executable instructions. The computer-executable instructions may be data in the form of program source code that may be capable of modifying a data file stored on the memory. The computer-executable instructions may be a series or sequence of instructions for a computing device that may be in the form of a programming language such as C++, Java, SQL, or the like. Various computer programming languages may be used to create the computer-executable instructions, and the invention is not limited to the computer programming languages disclosed herein.

Memory 217, 218 may be a portion of the servers 209, 211, respectively and may store data or other instructions for later use. The memory 217, 218 may be retained or lost when power is lost to the system. The processors 213, 219 may be capable of executing the computer-executable instructions. The computer-executable instructions may be executed by the processors 213, 219 after they have been stored in the memory 217, 218. The processors 213, 219 may be a centralized element within a computing system that may be capable of performing computations. For example, a processor may perform the computations that are described in the computer-executable instructions and then execute the computer-executable instructions. The computer-executable instructions may include data describing changes to a data file, such as the user profile 223 and the restaurant menu options 225.

Figure 3:
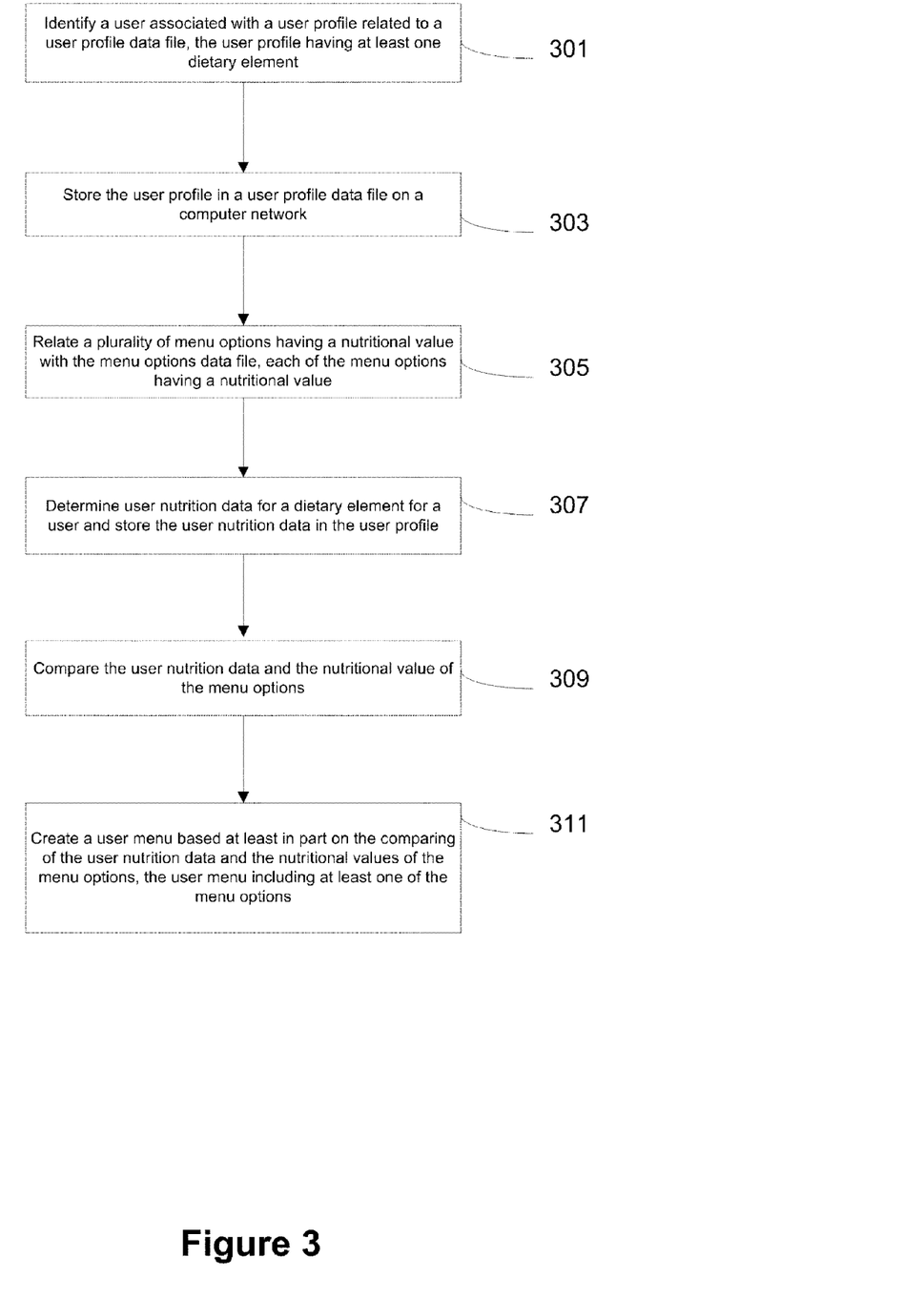
FIG. 3 illustrates an automated method of diet advising in accordance with aspects of the disclosure.

FIG. 3 illustrates a method of automating a diet advisor comprising identifying a user that may be associated with a user profile, the user profile having at least one dietary element at step 301; storing the user profile in a memory on a computer network, as in step 303; relating a plurality of menu options to a menu options data file, each of the menu options having a nutritional value, as illustrated in step 305; determining user nutrition data for a user and storing the user nutrition data in the user profile at step 307; comparing the user nutrition data and the nutritional value of the menu options at step 309; and creating a user menu based at least in part on the comparing of the user nutrition data and the nutritional values of the menu options, the user menu including at least one of the menu options, as illustrated in step 311.

As described above, a user may be identified in step 301. The user may be associated with a user profile that is related to a user profile data file. The user profile may be stored in a memory on a computer network, as described in detailed above, and as illustrated in step 303. The user profile may include at least one dietary element. The dietary element may include amounts of protein, fats, cholesterol, and other dietary elements that may interest the user and/or medical or other health professional having access to the user profile.

The dietary element may be identified by medical professional, a nutritional professional, an exercise professional, the user, a coach, and any other desired entity. The dietary element may include restrictions that prevent a user from consuming a defined quantity of an identified dietary element. For example, a user may be restricted to consuming up to 50 grams of fat per day. If the user's consumption of fat for a day exceeds 50 grams, the user will not be permitted to select foods that contain fat. A user may also be required to consume between 20 and 30 grams of protein. The user profile may suggest menu options to the user that increase the level of protein that may be consumed by the user to reach the daily goal of requiring the user to consume 20 to 30 grams of protein.

The user may be warned if a dietary element is lacking or in excess (e.g., exceeds an established limit). In the example above, the user may have a restriction to consumer below 50 grams of fat per day. A user may consume 50 grams of fat during breakfast and lunch. While a user may go to a restaurant for dinner, the user will not be able to select a menu option that contains fat. The user will be restricted from exceeding the dietary element limit established by the user profile. The user or other person or entity having access to the user profile may establish a limit or range for a dietary element in any desired manner or for any desired reason.

Further, the user profile may alert the user by an alarm or other message if the user attempts to select junk food more than one time per week. The alert may include a text message, audible or visible message, or any other alert that notifies the user and/or medical professional or entity having access to the user profile that the user selected an unacceptable menu option. The alert may prevent the user from selecting the menu option or may provide a notification that the menu option is given a poor ranking, as explained in greater detail below. The alert may delete the menu option without presenting the menu option as a selection for the user.

For example, a menu option may not contain a nutritional value that is found within a range of acceptable nutritional values (e.g., the nutritional value has a fat content that exceeds the allowable range of fat content for a user profile). A user may access the user profile and select a restaurant having a group of menu options, including a first menu option and a second menu option. The first menu option may contain nutritional values that are within the range that is permitted by the user profile. The second menu option may contain nutritional values (e.g., high fat content) that are not within the permitted range of nutritional values for a user profile. The first menu option may be presented to the user and the second menu option may not be presented to the user as a selection. Alternatively, the user may be presented with both the first menu option and the second menu option, but may be alerted if the user selects the second menu option. In this case, the second menu option may be treated in any manner that is consistent with the user profile.

A plurality of menu options may be related to a menu options data file, as illustrated in step 305. The menu options may include any edible or potable selection that may be offered to a consumer by a restaurant or other food service location. Each of the menu options may have a nutritional value. The nutritional value may indicate the quantity of vitamins, minerals, carbohydrates, proteins, fats, and other dietary elements of interest that are included in the menu option. A menu option may comprise a plurality of ingredients that may each have a nutritional value, as described in greater detail below.

Nutrition data for a user may be determined at step 307. The nutrition data may be stored in the user profile. The nutrition data may include any information about the user's nutrition such as dietary needs, dietary restrictions, allergies, and the like. The nutrition data may be related to the dietary element. The nutrition data may be a minimum amount of vitamins, nutrients, or other nutritional requirements that a user may be required to eat within a period, such as a week or a day. The nutrition data and the dietary elements may also have similar or the same information about the user's nutritional requirements.

The user nutrition data and the nutritional value of the menu options may be compared in step 309. The comparison may verify that the user is consuming acceptable foods that are in accordance with the user profile. The comparison may include identifying food, nutrients or the like that the consumer may or may not be permitted to consume when the user selects a menu options. The comparison may also include information about a nutritional deficiency in the menu option that the user selects.

A user menu may be created in step 311. The user menu may be based at least in part on the comparison of the nutrition data and the nutritional values of the menu options. The user menu may include at least one of the menu options. The user menu may also include a plurality of menu options. The user menu may identify the menu options that may be offered by a restaurant or other food service location that may be in accordance with the user nutrition data in the user profile.

The user menu may be documented and may be reported to the user profile or another end user, such as the user's doctor, nurse, exercise trainer, and the like. The user menu may include providing encouragement for the user when the user selects an acceptable menu option and may alert the user or discourage the user when the user attempts to select an unacceptable menu option. In examples, where the menu options may be ranked, the user may be discouraged from selecting a menu option that has been assigned a low ranking.

Figure 4:
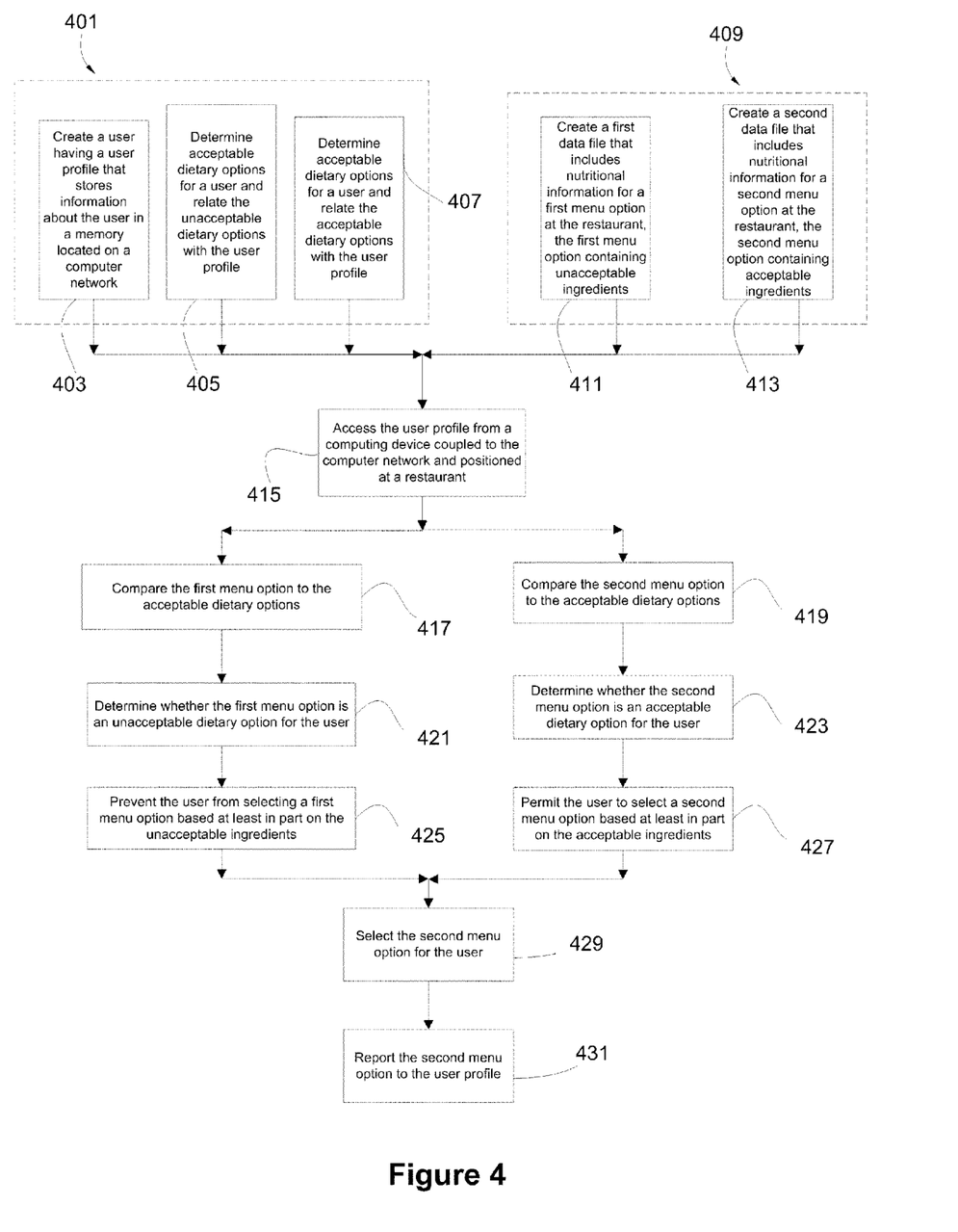
FIG. 4 illustrates a method of selecting a menu option, according to an embodiment of the disclosure.

FIG. 4 illustrates a method of selecting a menu option, in accordance with the invention. The method of selecting a menu option may be incorporated into the automated diet advisor method and system that are described above. A user profile 401 may be created that includes a user profile stored in memory on a computer network 403, acceptable dietary options for a user 405, and unacceptable dietary options for a user 407. An acceptable dietary option may be any food or drink that may be in accordance with the user profile and the nutrition data provided in the user profile. An unacceptable dietary option may be any food or drink that may not be in accordance with the user profile and the nutrition data provided in the user profile, such as a dietary restriction or food that causes an allergy. The acceptable and unacceptable dietary options may be defined by any parameters in the user profile.

A restaurant profile 409 may also be created that includes creating a first data file that includes nutritional information for a first menu option at the restaurant 411. The restaurant profile 409 may also include nutritional information for a second data file for a second menu option at the restaurant at step 413. The first menu option may include one or more unacceptable ingredients or may contain all unacceptable ingredients. An unacceptable ingredient may be a component of a menu option, such as an ingredient in a food dish prepared by a restaurant, that is not in accordance with the user profile and dietary options for a user. The second menu option may include ingredients that may be in accordance with the user profile and the dietary options for a user. The second menu option may not contain unacceptable ingredients or may contain elements that may not be restricted by the user profile.

The first menu option may be compared to the acceptable dietary options 417 and a determination may be made as to whether the first menu option is an acceptable dietary option for the user 421. The first menu option may be determined to contain unacceptable ingredients or may be wholly unacceptable as a menu option for the user. The user may be prevented from selecting the first menu option based at least in part on the first menu option's ingredients 425. The user may be prevented from selecting the first menu option by deleting or otherwise preventing the user from selecting the first menu option.

The second menu option may be compared to the acceptable dietary options of a user 419. A determination may be made as to whether the second menu option is an acceptable dietary option for the user 423. The second menu option may be identified as having acceptable ingredients or may simply not contain unacceptable ingredients. In FIG. 4, the user may be permitted to select the second menu option based at least in part on the presence of acceptable ingredients in the menu option. The second menu option may be selected by the user 429 and a report of the user's selection of the second menu option may be sent to the user profile 431.

The report may be configured to update the user profile to reflect the menu options that may have been selected by a user at a restaurant or other food service location. The report may include nutritional values for the menu options that a user selected. The report may be used, at least in part, to provide diet advice as the user continues to select menu options, in a dynamic fashion. For example, each time the user selects a menu option, the user profile may be updated with a report of the nutritional values and type of food of the menu option. The user may be provided dynamic diet advice based on the real-time reporting of menu options.

The user profile may send a status report to any other desired end user, such as the user and the user's doctor or dietitian. The status report may include any a list of menu options that were selected by the user over a period of time, such as a day, a week, a month, or a year. The status report may include a chart or other graph that reflects a user's progress over a defined range of time as well. The status report may include any desired status information relating to the user's health and/or diet advising and progress related to the diet advising.

Figure 5:
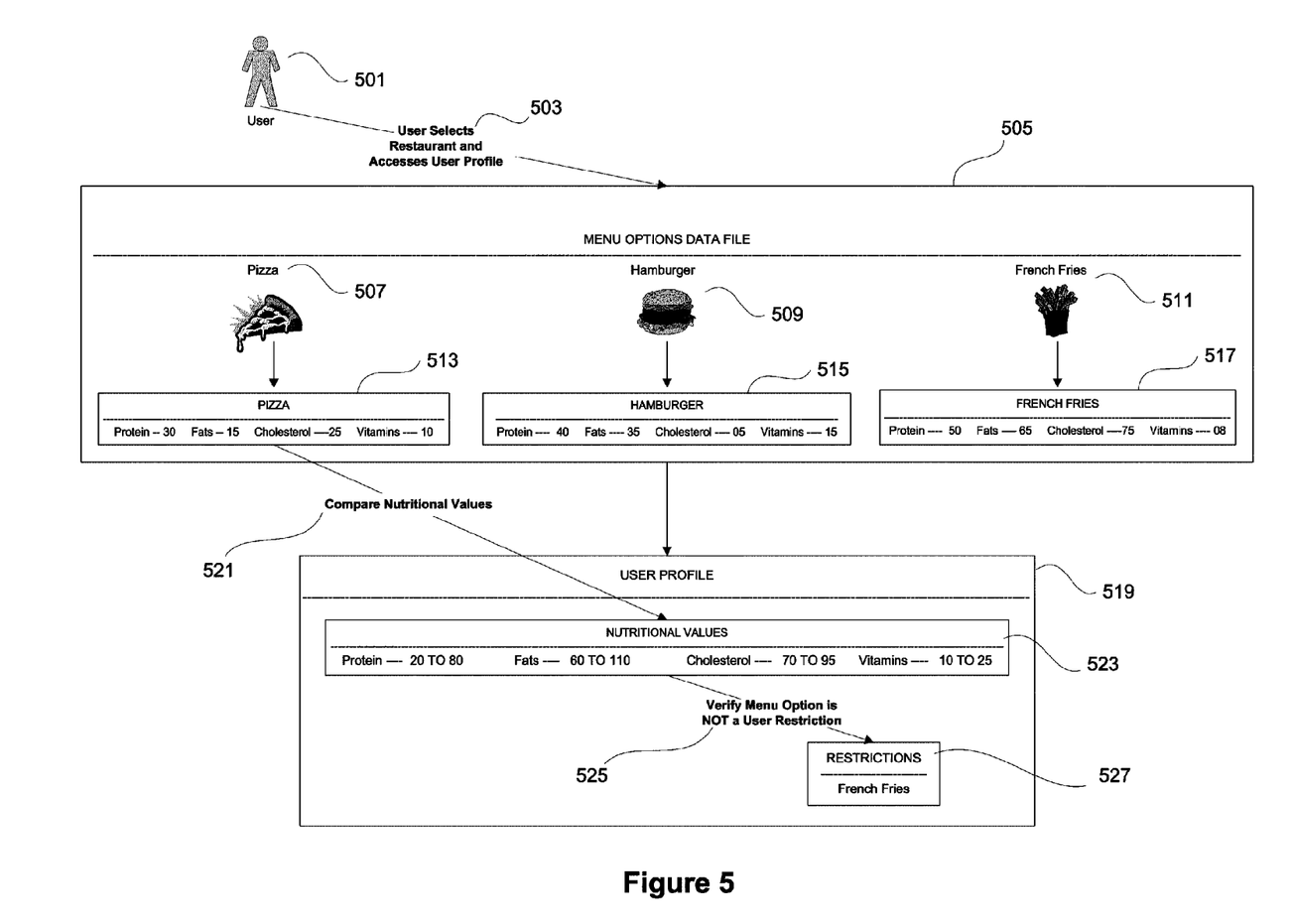
FIG. 5 illustrates a method of selecting a menu option at a restaurant, according to an aspect of the invention.

FIG. 5 illustrates yet another embodiment of the diet advising system and a method of providing a user with diet advice. A user 501 may wish to visit a restaurant and access a user profile at the restaurant 503. The user 501 may access a menu options data file 505 that may be associated with the restaurant at which the user wishes to eat. The restaurant may offer several menu options including pizza 507, a hamburger 509, and French fries 511. The pizza 507 menu option may be associated with pizza nutritional values 513, the hamburger 509 menu option may be associated with hamburger nutritional values 515, and the French fries 517 menu option may be associated with French fries nutritional values 517.

Each of the pizza nutritional values 513, the hamburger nutritional values 513, and the French fries nutritional values 517 may include information about such dietary elements as protein, fats, cholesterol, and vitamins. A user profile 519 may contain information about a user such as the user's personal information, health information, dietary restrictions, and dietary needs. The user profile 519 may include nutritional values 523 that define an amount or range of amounts of nutritional values that the user may be permitted to consume.

The nutritional values may be compared 521 to a user profile 519. The nutritional values of the menu options may be compared by total nutritional values of the menu option or by dietary ingredient of the menu option. For example, the nutritional values of the user profile may establish a range of amounts of protein, fats, cholesterol, and vitamins that the user may consume over the course of a defined period of time, such as a day. A restaurant may provide the user with three menu options such as pizza 507, a hamburger 509, and French fries 511 that each may have nutritional information that includes the amount of protein, fats, cholesterol, and vitamins that each menu option contains.

In the example above, a user may wish to select the pizza 507 as the menu option at a restaurant. The pizza 507 may have nutritional values 513 that include 30 grams of protein, 15 grams of fat, 25 grams of cholesterol, and 10 grams of vitamins. When the user selects the pizza 507 at a restaurant, each of the protein, fat, cholesterol, and vitamins nutritional values for the pizza 507 may be compared to the nutritional values 523 of the protein, fat, cholesterol, and vitamins ranges established in the user profile 519. The nutritional values of the user profile 523 may serve as a threshold value that the menu option must contain or the user is prohibited from selecting the menu option. For example, the pizza contains 30 grams of protein and is within the range of permitted protein amounts of 20 to 80 grams, designated by the user profile 519. If the pizza 507 contains enough protein, then the level of fat in the pizza 507 or 15 grams may be compared to the range of permissible fat content or 60 to 110 grams of fat per day. In this case, if the user has consumed greater than 110 grams of fat earlier in the same day as ordering the pizza 507, then the user will be restricted from selecting the pizza 507 as a menu option. Alternatively, if the user has consumed less than 95 grams of fat, then the user will be permitted to select pizza 507 as the menu option. The user must not exceed the nutritional value limit 523 set by the user profile 519 when selecting a menu option.

When the nutritional values of the menu option, such as the pizza 507 are acceptable and have met the limitations of the nutritional value ranges 523 of the user profile 519, then the menu option may be analyzed to determine whether it contains a user restricted menu option or nutritional value. The user profile 519 may contain a menu option, food type, nutritional value, dietary element, or the like from which the user is completely restricted from selecting. In FIG. 5, the user may be restricted from selecting French fries 527 as a menu option. The user may visit a restaurant, but may be restricted from ordering French fries. Once the menu option meets the nutritional value limits 523, then the diet advisor system verifies that the menu option is not a restricted item 525. After the menu option is verified to be a permitted menu option, the user may select the menu option and consume the food item.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-implemented method, comprising:
   receiving, in one or more computers, user profile data for a visitor to a particular restaurant, the user profile data including data specifying one or more dietary requirements for the user;
   receiving, in the one or more computers, menu options data for the particular restaurant, the menu options data specifying nutritional information for each of a plurality of menu options offered by the particular restaurant;
   classifying, with the one or more computers, one or more of the plurality of menu options as menu options that are acceptable for the user given the dietary requirements for the user and classifying one or more of the plurality of menu options as menu options that are not acceptable for the user given the dietary requirements of the user from a comparison of the nutritional information for each menu option and the one or more dietary requirements for the user;
   assigning, with the one or more computers, a score to each of the one or more menu options that are acceptable for the user based at least in part on the nutritional values of the menu options;
   presenting a representation of each of the one or more menu options that are acceptable for the user, wherein the representation of each menu option is presented in an order corresponding to the assigned scores;
   receiving user input selecting a representation of a particular menu option that is acceptable for the user;
   updating, in the one or more computers, the user profile data to reflect the selecting of the representation of the particular menu option; and
   reclassifying, with the one or more computers, the plurality of menu options using the updated profile data.

2. The method of claim 1, where the user profile includes a medical profile of the user for providing information related to the user.

3. The method of claim 1, further comprising establishing a range of user nutrition data and eliminating the menu options that have a nutritional value that is not within the range.

4. The method of claim 1, further comprising establishing a quantity limit for at least one of the dietary elements and restricting the menu options if a user consumes more than the quantity limit.

5. The method of claim 1, further comprising rewarding the user for making a healthy menu choice.

6. The method of claim 1, wherein the user profile data is received over a computer network.

7. The method of claim 1, wherein presenting a representation of each of the one or more menu options that are acceptable for the user further comprises not presenting a representation of any of the one or more menu options that are not acceptable for the user.

8. The method of claim 1, further comprising:
   receiving user input selecting one of the non-acceptable menu options; and
   alerting the user that a non-acceptable menu option has been selected.

9. The method of claim 1, wherein the user profile further includes nutritional information about one or more foods previously consumed by the user.

10. The method of claim 1, wherein the one or more dietary requirements include a requirement specifying an allowed range of nutritional values.

11. The method of claim 1, wherein the one or more dietary requirements include a requirement specifying a maximum number of times the user can eat a particular food.

12. The method of claim 1, wherein the one or more dietary requirements include a requirement specifying an allowable portion size.

13. The method of claim 1, wherein the one or more dietary requirements include a requirement specifying an ingredient that causes an allergic reaction in the user.

14. A system comprising:
   one or more computers configured to perform operations comprising:
      receiving, in one or more computers, user profile data for a visitor to a particular restaurant, the user profile data including data specifying one or more dietary requirements for the user;
      receiving, in the one or more computers, menu options data for the particular restaurant, the menu options data specifying nutritional information for each of a plurality of menu options offered by the particular restaurant;
      classifying, with the one or more computers, one or more of the plurality of menu options as menu options that are acceptable for the user given the dietary requirements for the user and classifying one or more of the plurality of menu options as menu options that are not acceptable for the user given the dietary requirements of the user from a comparison of the nutritional information for each menu option and the one or more dietary requirements for the user;

assigning, with the one or more computers, a score to each of the one or more menu options that are acceptable for the user based at least in part on the nutritional values of the menu options;

presenting a representation of each of the one or more menu options that are acceptable for the user, wherein the representation of each menu option is presented in an order corresponding to the assigned scores;

receiving user input selecting a representation of a particular menu option that is acceptable for the user;

updating the user profile data to reflect the selecting of the representation of the particular menu option; and reclassifying, with the one or more computers, the plurality of menu options using the updated profile data.

15. The system of claim 14, wherein the user profile data is received over a computer network.

16. The system of claim 14, wherein presenting a representation of each of the one or more menu options that are acceptable for the user further comprises not presenting a representation of any of the one or more menu options that are not acceptable for the user.

17. The system of claim 14, wherein the user profile further includes nutritional information about one or more foods previously consumed by the user.

18. A computer readable medium encoded with a computer program, the program comprising instructions that when executed by data processing apparatus cause the data processing apparatus to perform operations comprising:

receiving, in one or more computers, user profile data for a visitor to a particular restaurant, the user profile data including data specifying one or more dietary requirements for the user;

receiving, in the one or more computers, menu options data for the particular restaurant, the menu options data specifying nutritional information for each of a plurality of menu options offered by the particular restaurant;

classifying, with the one or more computers, one or more of the plurality of menu options as menu options that are acceptable for the user given the dietary requirements for the user and classifying one or more of the plurality of menu options as menu options that are not acceptable for the user given the dietary requirements of the user from a comparison of the nutritional information for each menu option and the one or more dietary requirements for the user;

assigning, with the one or more computers, a score to each of the one or more menu options that are acceptable for the user based at least in part on the nutritional values of the menu options;

presenting a representation of each of the one or more menu options that are acceptable for the user, wherein the representation of each menu option is presented in an order corresponding to the assigned scores;

receiving user input selecting a representation of one of the acceptable menu options;

updating, in the one or more computers, the user profile data to reflect the selecting of the representation of one of the acceptable menu options; and reclassifying, with the one or more computers, the plurality of menu options using the updated profile data.

19. The computer readable medium of claim 18, wherein presenting a representation of each of the one or more menu options that are acceptable for the user further comprises not presenting a representation of any of the one or more menu options that are not acceptable for the user.

20. The computer readable medium of claim 18, wherein the user profile further includes nutritional information about one or more foods previously consumed by the user.

* * * * *

UNITED STATES PATENT AND TRADEMARK OFFICE
CERTIFICATE OF CORRECTION

| | |
|---|---|
| PATENT NO. | : 7,882,150 B2 |
| APPLICATION NO. | : 12/025594 |
| DATED | : February 1, 2011 |
| INVENTOR(S) | : Tushar Badyal |

It is certified that error appears in the above-identified patent and that said Letters Patent is hereby corrected as shown below:

On the Title page, please insert

--(30)    Foreign Application Priority Data

December 24, 2007 (IN) .................................. 2547/MUM/2007--

Signed and Sealed this
Third Day of May, 2011

David J. Kappos
*Director of the United States Patent and Trademark Office*